Figure 1:
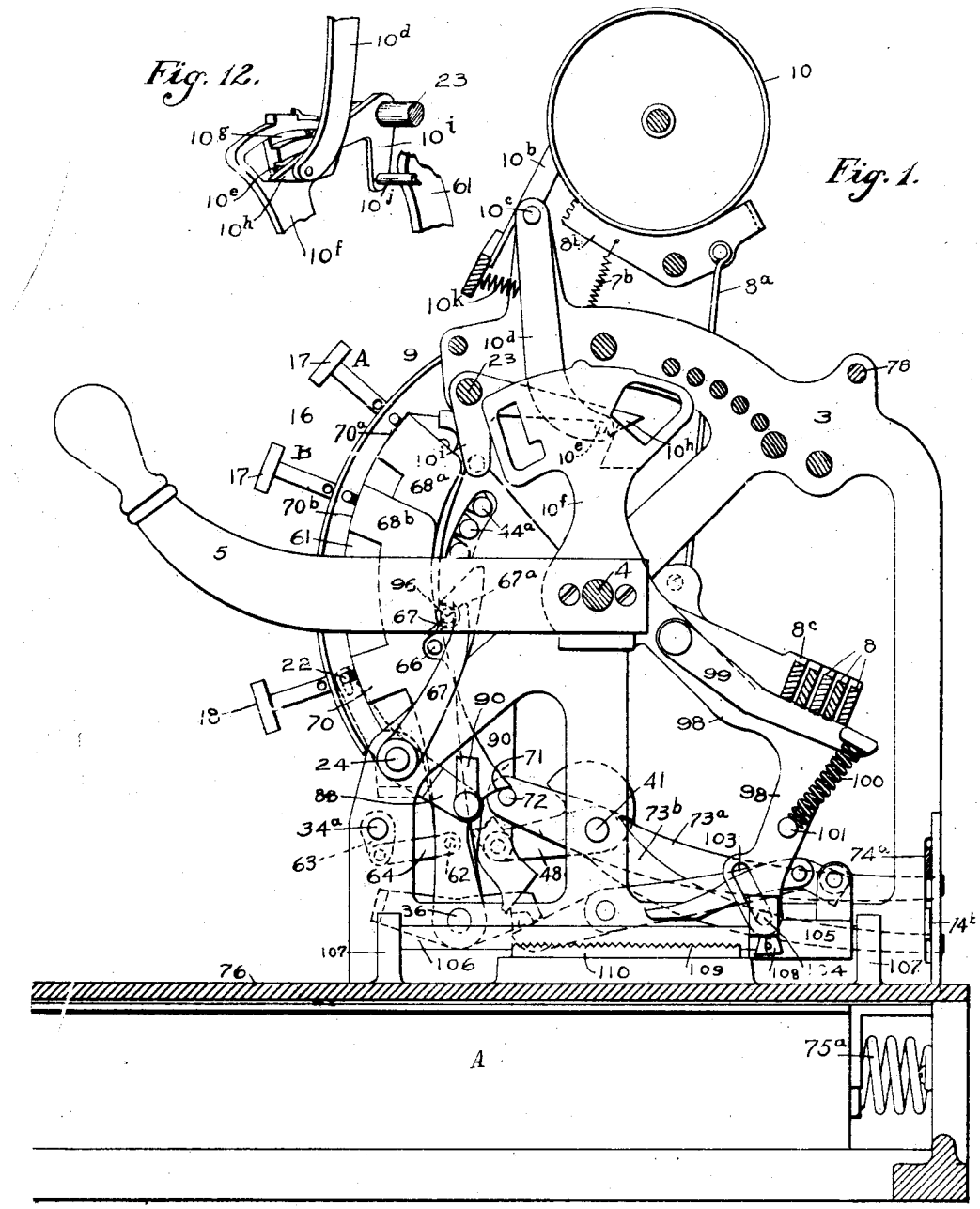

No. 870,624. PATENTED NOV. 12, 1907.
H. S. HALLWOOD.
CASH REGISTER.
APPLICATION FILED OCT. 22, 1906.

5 SHEETS—SHEET 1.

WITNESSES:

INVENTOR.
Henry S. Hallwood.
BY
ATTORNEYS.

No. 870,624. PATENTED NOV. 12, 1907.
H. S. HALLWOOD.
CASH REGISTER.
APPLICATION FILED OCT. 22, 1906.
5 SHEETS—SHEET 3.
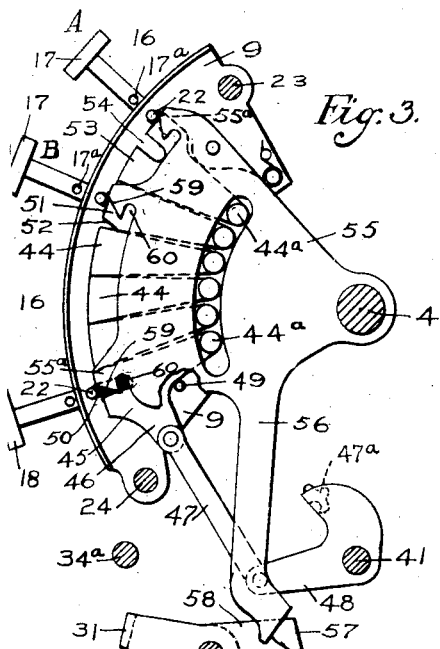
Fig. 3.
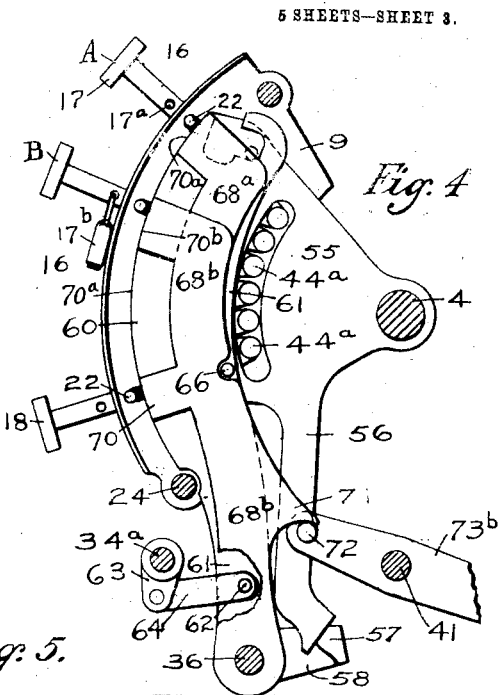
Fig. 4.
Fig. 5.
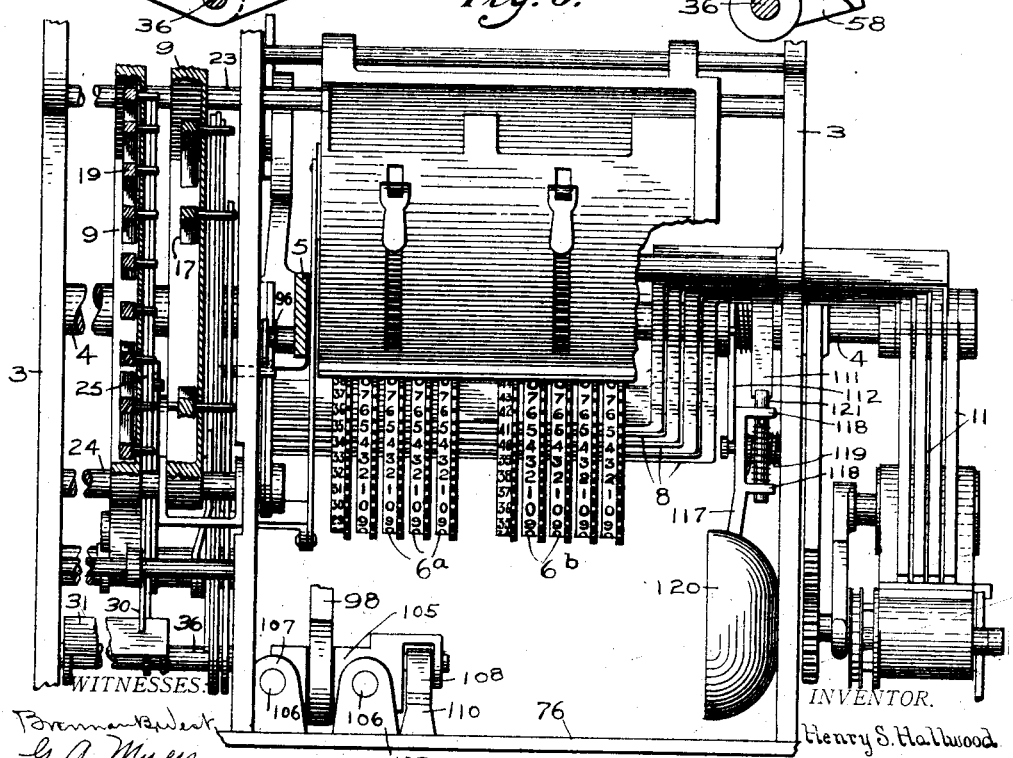
WITNESSES.
Brennan Bewert
G. A. Myers
INVENTOR.
Henry S. Hallwood
BY Bates, Fouts & Hull
ATTORNEYS.

No. 870,624. PATENTED NOV. 12, 1907.
H. S. HALLWOOD.
CASH REGISTER.
APPLICATION FILED OCT. 22, 1906.
5 SHEETS—SHEET 4.
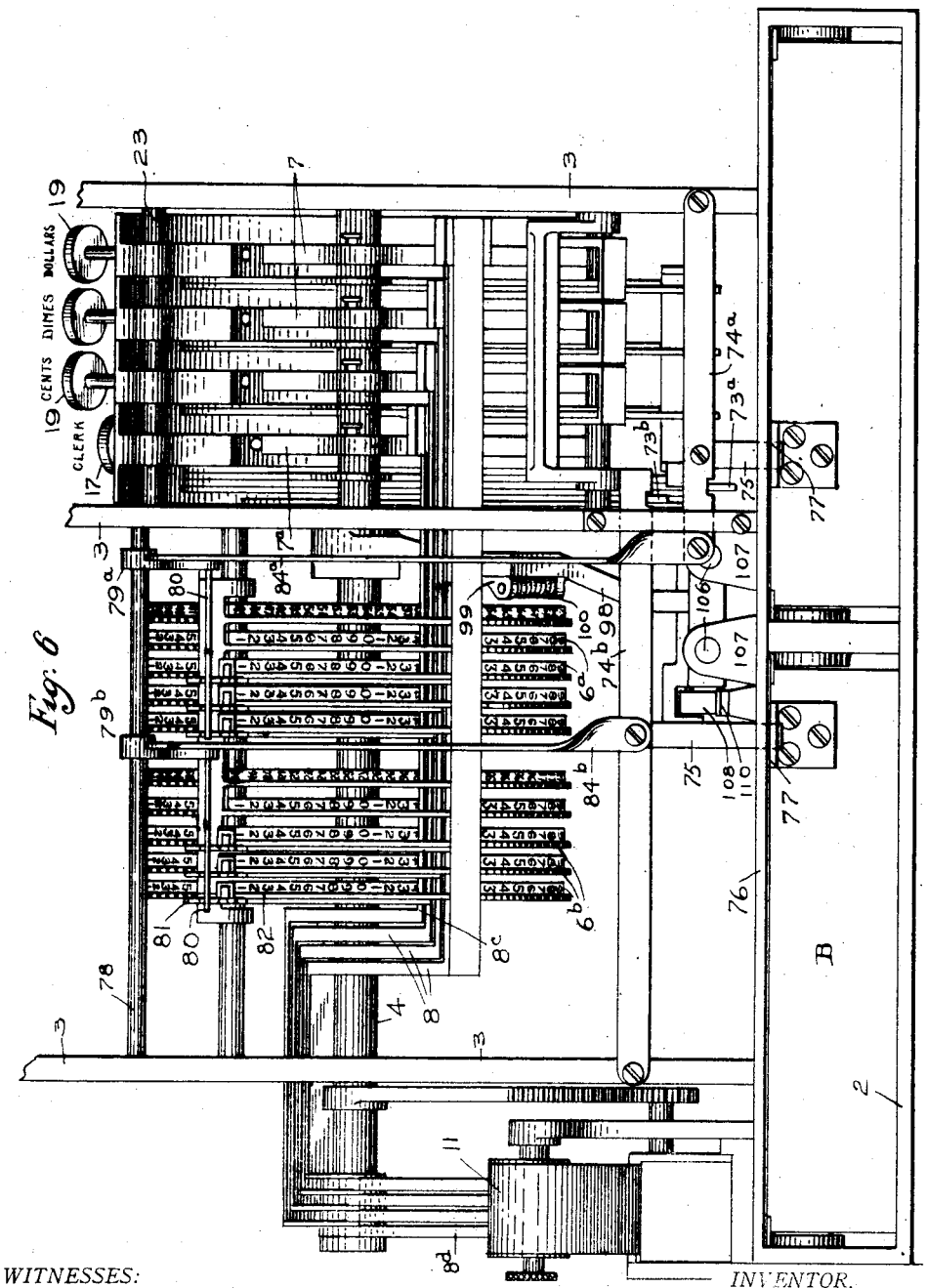
WITNESSES:
INVENTOR.
Henry S. Hallwood.
BY
ATTORNEYS.

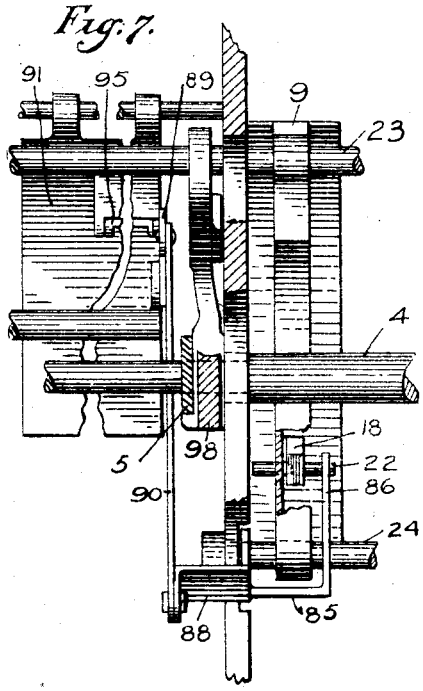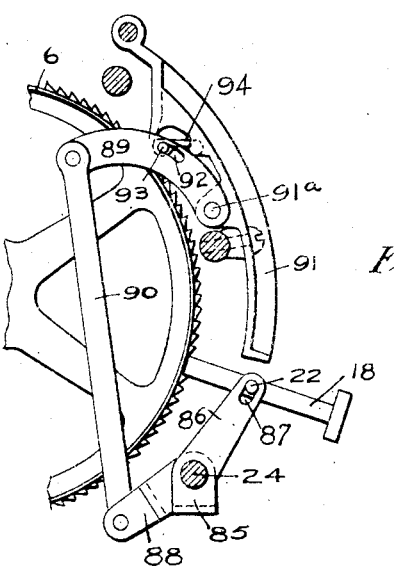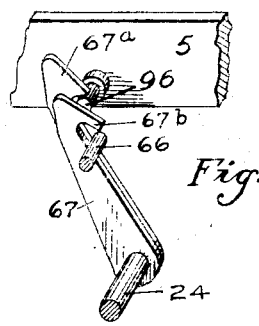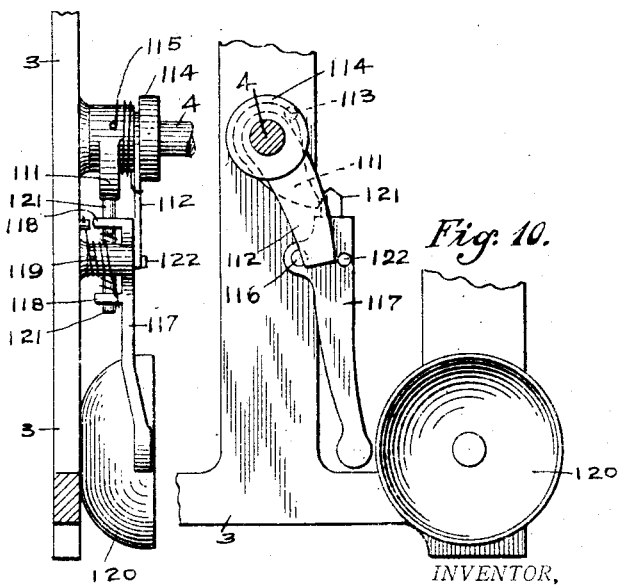

UNITED STATES PATENT OFFICE.

HENRY S. HALLWOOD, OF COLUMBUS, OHIO, ASSIGNOR TO THE INTERNATIONAL REGISTER COMPANY, OF COLUMBUS, OHIO, A CORPORATION OF OHIO.

CASH-REGISTER.

No. 870,624.   Specification of Letters Patent.   Patented Nov. 12, 1907.

Application filed October 22, 1906. Serial No. 340,096.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a full, clear, and exact description, reference being had to the accompanying drawings.

This invention relates to improvements in cash registers of the lever-operated, multiple-drawer type.

One of the several objects of the invention has particular relation to improvements in connection with the drawers, which are located side by side, instead of one above the other, so that one attendant may operate the register with his drawer open, or so that the two attendants may operate the register, each having his drawer open at the same time, which is impracticable when the drawers are in tiers, one above another. But this improvement relates to and is particularly a radical differentiation of the type of machine patented to P. Lalor, March 31, 1903, #724,409—See, Oct. 25th, 1904, #773,102—W. H. Muzzy, Dec. 29, 1903, #748,406—W. H. Muzzy, Mch. 1, 1904, #753,512—W. H. Muzzy Mch. 1, 1904, #753,513—C. C. Heyne, June 21, 1904, #762,903—W. H. Muzzy, Mch. 8, 1904, #754,082—and W. H. Muzzy, July 5, 1904, #763,997.

A still further object of the invention is to provide means whereby both cash drawers may be opened simultaneously by the depression of a single key, said key being used solely by the proprietor having charge of the machine. In connection with this proprietor's key, means are provided for preventing its operation when a value or clerk's key is depressed, and for preventing the depression of any of said keys when the proprietor's key is operated.

A further object of the invention is to provide a new form of detent plate for the value keys and clerks' initial keys, and inter-locking mechanism between the two so as to prevent the manipulation of the value keys after an initial key has been depressed.

A further object of the invention s to simplify and improve the mechanism by the removal of unnecessary parts, such as multiple hand levers, one for each clerk and drawers, as shown in the Muzzy patent #703,997; two operating drawers as shown in the Muzzy patent #754,082; two sets of clerks' initials as shown in the Heyne patent #762,903; and an operating slide, as shown in the Muzzy patent, #748,406.

It will be observed that the patents to Muzzy and Heyne are allowed upon improvements added to the machine shown in the Hallwood patent #704,795 and that a large part of the drawings disclosed by Muzzy and Heyne are an exact reproduction of the Hallwood patent. In the same way, this application, while it is a radical differentiation and improvement upon the devices shown by Muzzy and Heyne, will largely follow the drawings and specifications of the patents to Muzzy and Heyne referred to, except, of course, in respect to the nature and functions of the new devices described and claimed in this application.

With these and other incidental objects in view, the invention consists in certain novel features of construction and combinations of parts, the essential elements of which are shown and set forth in the appended drawings and claims, the preferred embodiment of which is hereinafter specifically described in the following specification.

Figure 2:
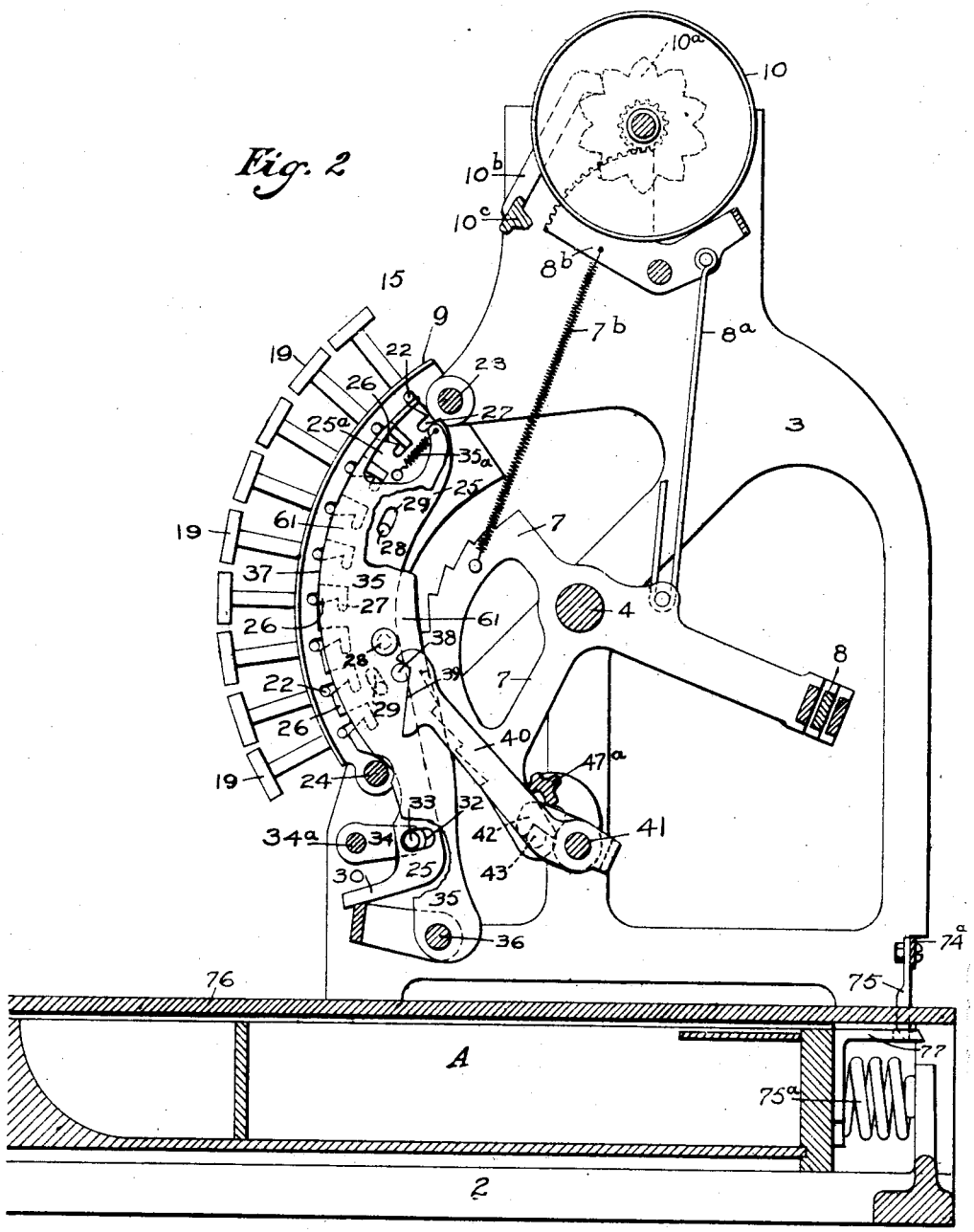

In said drawings, Figure 1 is a sectional elevation taken through my improved cash register on a plane just to the right of the main operating lever; Fig. 2 is a similar view taken just to the right of one of the banks of value keys; Fig. 3 is a detailed sectional view taken at the right of the bank of special keys, the latch plate and the drawer-release plates being omitted; Fig. 4 is a view like Fig. 3, except that the latch plate and the drawer-release plates, with one of the drawer-releasing levers are shown: Fig. 5 is a front view of portions of my invention, said view being partly in section and partly in elevation; Fig. 6 is a rear elevation of the lower part of a cash register embodying my improvements; Fig. 7 is a rear view, partly in section, of the shutter for the counter wheels and the mechanism for operating the same; Fig. 8 is a side elevation of parts of the mechanism shown in Fig. 7; Fig. 9 is a detailed view of the latches for releasing the main operating lever; Figs. 10 and 11 are side and front elevations, respectively, of the mechanism for sounding the alarm, and Fig. 12 is a detailed view of the mechanism for releasing the indicators.

Referring now to the accompanying drawings for a more specific description, the following parts are substantially common to most of the patents referred to and, for that reason, will not be particularly described; viz., the drawers or cash receptacles A and B; their case or frame 2; the cash register frames 3; the main shaft 4; the hand lever 5; the counting wheels 6ᵃ and 6ᵇ; the stepped segments 7; the yokes 8; the key-bank frames 9; the indicators 10, and the tape printing mechanism 11.

Situated on the front of the machine, and projecting radially from the shaft 4 as a center, are the banks of keys, divided into two groups. The first three banks, 15, on the left as viewed from in front, each have nine keys, and represent, in order from the left, dollars, dimes and cents. These are called value keys. The next bank to the right, 16, has two keys 17,—one for the use of each clerk, and adapted to release its respective drawer and to cause the amount to be added on its respective counter only; and also a proprietor's key 18, adapted to release both drawers simultaneously, as will be hereinafter more fully described. Both clerks' keys 17 are normally inoperative until a value key has been depressed, while the proprietor's key 18 is normally operative until a value key has been depressed, when it is rendered inoperative. The construction of the various parts for accomplishing these and other incidental results is as follows:—

Each of the value banks, 15, consists of the keys 19, mounted in a segmental frame 9, and yieldingly held in an outward position by springs bearing against the frame and key pins 22, as is common in this type of cash register, the frames 9 being rigidly supported on the rods 23 and 24. Mounted on the side of the frames 9, adjacent to the rows of value keys 19, are detent plates 25, said plates having hooks 25ᵃ with inclined faces 26 and recesses 27, adapted to receive the key pins 22. These detent plates are each mounted on studs 28, projecting from the frames 9 and extending into slots 29 in the detent plates 25, thus permitting a short vertical movement of the detent plates. In the lower end of the detent plate 25 is a transverse slot 32, adapted to engage a stud 33 on a rock arm 34, said arm being secured to a rod or shaft 34ᵃ. Lying adjacent to each of the detent plates 25 is a key latch plate 35 said plate being loosely journaled on a shaft 36. The front edge, 37, of the latch plate is curved to approximately conform to the line of key pins 22, which pins engage the said latch plate and oscillate it rearwardly when a key 19 is depressed. Attached to the top end of the latch plate 35 is one end of a spring 35ᵃ, the other end thereof being attached to the detent plate 25, so as to hold the said detent plate in suspension. Extending laterally from near the back edge of the said latch plate 35, is a stud 38, that is adapted to engage the cam face 39 on the long arm of an oscillating L-shaped lever 40, said lever being mounted on a shaft 41. The short arm of said lever 40 is provided with a hook detent 42 that is adapted to engage a stud 43, projecting laterally from the lower end of the stepped segments 7, as fully described and shown in my application No. 28,740, and as shown in dotted lines in Fig. 2 of the accompanying drawings.

The manner of operation of the devices just described is as follows:—When a value key 19 is depressed in any bank, the pin 22 of said key impinges against the inclined face of its hook 25ᵃ on the detent plate 25 for that bank, thereby depressing said plate and tensioning the spring 35ᵃ until the pin 22 enters the recess 27, when the detent plate 25 is again raised by the retraction of the spring 35ᵃ and the key 19 is thus arrested in a depressed position. Whether the key so arrested may be released by depressing another key of this bank depends entirely on the length of the inclined face 26 compared with the depth of the recess 27. As shown, the keys are releasable by simply depressing another key in the same bank with the one to be released. Simultaneously with the operation just described, the pin 22, bearing against the front edge of the lock plate 35, causes it to oscillate rearwardly, carrying its pin 38 against the long arm of the lever 40, and raising the detent hook 42 from engagement with the pin 43 on the stepped segment 7, thus permitting the segment 7 to oscillate until it is arrested by the end of the depressed key. This oscillation of the segment permits the yoke 8, connected therewith, to drop; and as said yoke is connected, through the link 8ᵃ and the oscillating segment 8ᵇ, with the pinion on the corresponding indicator wheel, 10, said wheel will be turned to indicate the value of the depressed key. The oscillation of the segments 7 is caused by the weights of the yokes 8, assisted initially by the springs 7ᵇ that connect the segments 7 with the segments 8ᵇ for turning the indicators. Said springs also operate to return the indicators to their normal or zero positions when they are released. At the same time, the printing devices 11 are set for printing and the registering devices for registering, in the manner set forth in my said application No. 28,740, the same being well known in this type of cash register. The above described movement of the lever 40 also unlocks the clerks' initial key bank, as will now be described.

*Clerks' initial key bank.*—The clerks' initial key bank, 16, consists of the clerks' keys 17 and the proprietor's key 18, said keys being mounted in a segmental frame 9 and yieldingly held in an outward position by springs bearing against the frame and key pins 22 as is common in this type of machine. Mounted on the side of the frame 9 is a series of interfering stop plates, 44, adapted to normally prevent the depression of the keys 17 and 18 by engaging the pins 22 thereon. The inner ends of said stop plates 44 are pivoted at points 44ᵃ, on a line preferably concentric to said pins 22. The sides of the plates diverge toward the outer ends so that the entire arc of the angle occupied by the keys is filled by said plates. The lower stop plate, 45, has an arm 46 connected by a link 47 to a rocker arm 48, on the shaft 41, said stop-plate being supported on a pin 49 in the frame 9. A slot 50, cut in the edge of the plate 45, is adapted to receive the pin 22 on the key 18 when the latter is depressed. The plate 51, opposite the lower or "B" clerk's key 17, has a beveled face 52 formed on its lower angle, said beveled face being adapted to be engaged by the pin 22 of the lower clerk's key 17, after a value key has been depressed, as will be more fully explained hereinafter. The plate 53, opposite the upper or "A" clerk's key 17, has a slot 54 cut in its front edge that is adapted to receive the pin 22 of this key when it is depressed. The remaining plates of the series perform no further function than merely to fill the space between the proprietor's stop plate 45 and the clerk's stop plate 51, unless more clerks' keys are used, in which case the plate opposite said additional keys would be provided with a beveled face, similar to that on plate 51. Normally, the proprietor's stop plate 45 rests on the pin 49, and the slot 50 may be entered by the pin 22 on the proprietor's key; said key being normally depressible. On the contrary, the ends of the plates 51 and 53 normally lie in the path of the line 22 of the clerks' keys 17, so that they are not depressible.

The rocker arm 48 is rigidly secured to a bar 47ᵃ extending across the value key banks 15 and normally lying on the long arms of the L-shaped levers 40, so that, when a value key is depressed, the oscillation of the corresponding lever 40 oscillates the rocker arm 48, and thus lifts the stop-plates 44, carrying the slot 50 beyond the path of the pin 22 of the key 18, while the beveled face 52 and the slot 54, are brought in line with the pins 22 on their respective clerks' keys 17. If, when in this position, clerk B's key is depressed, the pin 22 thereon engages the beveled face 52 and thus further oscillates the plates 51 and 53, so that the slot 54 is carried beyond the path of the pin 22 on clerk A's key, which again becomes locked against depression. If, however, clerk A's key had been depressed, its pin 22 would have entered the slot 54 and prevented it from further upward movement by plate 51, so that clerk B's key would be locked against depression.

Journaled on shaft 4, and adjacent to the stop plates 44, is a detent plate 55, said plate having a pendent arm, 56, that is adapted to rest on a lateral projection 57 from a rocker arm 58, said arm being secured to the rock shaft 36. The forward edge of said detent plate 55, which coincides with the line of the pins 22 in the key-bank 16, is provided with hooks 55$^a$, having beveled faces 59 and recesses 60, said recesses being adapted, when a clerk's initial or the proprietor's key is depressed, to receive the pin 22 on the key and hold the latter depressed during the remaining operation of the machine. Mounted on the shaft 36 is a latch plate 61, having a stud 62, projecting laterally therefrom, by which it is connected, through a link 64, to a rocker arm 63, fast on the shaft 34$^a$. A pin 66, projecting from the latch plate 61, is adapted to engage a double hook-detent 67, and 67$^a$ to prevent the manipulation of the clerks' initial keys 17, and to release the main operating lever after the main operating members have been released. When the hook 67$^a$ alone is used it is possible, by successive taps on an initial key, to cause the pin 66 to knock the hook 67$^a$ out of engagement with the stud 96 on the main operating lever 5 and release the operating mechanism before the initial key has been caught by its detent. In such case there would be no indication or printed record of the initial key thus used. This operation is made possible by the fact, that after each tap, the plate 61, carrying the pin 66, swings back to its original position, from whence it can be driven with considerable momentum. The additional detent 67 has a hook 67$^b$ that engages with the pin 66 on the plate 61 just as soon as the detents 67 and 67$^a$ are forced out of their normal positions. This engagement prevents the return of the plate 61; or, if said plate returns, it also draws back the hooks 67 and 67$^a$ so that the pin 96 on the operating lever is again fully reëngaged. The plate and the detent 67 are thus coupled together. Simultaneously with the operation of the latch plate, the shaft 34$^a$ is rocked through link 64 and arm 63. This movement of the rock-shaft 34$^a$ lifts the rocker arms 34, thereby locking the detent plates 25 into engagement with the pins 22 of the value banks of keys, so that said keys can not be released except in the intended manner. When such a locking device for the value keys is not provided, it may be possible to first depress a value key, say the "nine" key, and then depress a clerk's initial key. By then partially depressing another value key in the same bank with the key first depressed, said key may be released, and the machine thus caused to give an improper registration and indication. The latch plate 61 for the initial key bank is also caused to release the indicators by the following described means:—

The indicators are each provided with a notched wheel or disk 10$^a$, with the notches of which are adapted to engage detents 10$^b$ carried by a shaft 10$^c$ that is journaled in the frames 3 of the machine. Rigidly connected with said shaft is a depending arm 10$^d$, having on its lower end a pin or stud 10$^e$. Coöperating with said pin is a cam member 10$^f$, having a substantially rectangular-shaped race-way 10$^g$ in which said pin is adapted to travel as the cam moves back and forth, the cam being secured to the main operating lever 5. Figs. 1 and 12 show these parts in their normal positions, the pin 10$^e$ being near the rear end of the raceway, and being engaged by a hook 10$^h$ that is pivoted upon the cross rod 23. The hook 10$^h$ is in the shape of a bell crank, the depending arm 10$^i$ of which is provided with a pin or stud 10$^j$ that projects laterally into the rear of the latch plate 61 for the initial key bank. The arm 10$^d$ is under pressure from a spring 10$^k$, tending to force it to the rear, or to the left as shown in Fig. 12. When the latch plate 61 is forced to the rear by the depression of an initial key, the hook will be lifted from the pin or stud 10$^e$ which will release the arm 10$^d$, thereby permitting the indicators to be released so that they will be returned to their normal or zero positions by the springs 7$^b$. This release of the indicators takes place simultaneously with the release of the main operating lever, and simultaneously with the release of the cash drawers, as will hereinafter appear.

*Drawer release.*—Adjacent to the latch plate 61 for the initial keys, and journaled on the shaft 36, are two drawer release plates, 68$^a$ for clerk A, and 68$^b$ for clerk B. Each plate has a face edge 70, that is adapted to be engaged by the pin 22 of the proprietor's key. The plate 68$^a$ has a face 70$^a$ that is adapted to be engaged by the pin 22 on clerk A's key, and the plate 68$^b$ has a similar face 70$^b$ that is adapted to be engaged by the pin on clerk B's key. Each of these plates is also provided on its rear edge with a shoulder 71 that is adapted to engage with a corresponding stud 72 on the short end of one of a pair of drawer release-levers 73$^a$ and 73$^b$. These release-levers are pivoted on the shaft 41 and each lever is controlled by its respective clerk's key 17. Said levers project to the rear of the machine, and each engages on its outer end a lever 74$^a$ and 74$^b$ respectively. Said levers 74$^a$ and 74$^b$ are each pivoted on the rear edge of a frame 3 and extend toward the center of the machine, where the free ends thereof rest on the rear ends of the levers 73$^a$ and 73$^b$ respectively. Depending from each of the levers 74$^a$ and 74$^b$, is a latch bolt 75, which passes down through the base plate 76 and engages with a latch plate 77 on each of the drawers, A and B. When released the drawers are thrown open by springs 75$^a$ at the rear thereof.

*Counter cut-out.*—When a set of counter wheels is employed for each clerk, means are provided by which said sets are normally locked, and by which each may be unlocked by the operation of its respective clerk's key. For this purpose a rod 78 is located between the frames 3 above and to the rear of the counter wheels 6$^a$ and 6$^b$, on which rod are journaled rocker arms 79$^a$ and 79$^b$, each of said arms being adjacent to its respective series of counter wheels 6ª or 6ᵇ. The free end of each of said rocker arms is provided with a pin 80 which extends laterally across the faces of the sets of counter wheels, and is engaged by the hooks 81 on the radial pawl-carrying arms 82. These arms, with their hooks, are common in machines of the type shown, and are fully shown and described in my pending application No. 28,740. The pins 80 are normally held in engagement with the hooks 81 by the weight of their respective levers 74ª and 74ᵇ, or springs may be provided for assisting in this respect. The rocker arms 79ª and 79ᵇ are connected to the levers 74ª and 74ᵇ by links 84ª and 84ᵇ, the construction being such that when a lever 74ª or 74ᵇ is raised by the depression of its respective clerk's initial key 17, or when both levers 74ª and 74ᵇ are raised by the depression of the proprietor's key 18, the pins 80 are oscillated out of engagement with the hooks 81, which allows the arms to drop down to a position controlled by the depressed value key and its corresponding yoke 8.

Shutter-opener.—Mounted on the rod 24 is a yoke 85, one arm, 86, of which has a slot 87 near its upper end that is adapted to engage the key pin, 22, of the proprietor's key 18. The opposite end, 88, of said yoke is bent downwardly and laterally, and is connected to a lever 89 by a link 90. Said lever 89 is pivoted to the edge of the counting wheel shield 91 at 91ª, and is provided with a slot 92, into which projects a pin 93 on the end of a shutter 94 that is hinged on the inside of the shield 91 and is adapted to close the slotted opening 95 in the shield 91. Thus the shutter is opened by the oscillation of the lever 89 and yoke 85, said oscillation being caused by the depression of the proprietor's key 18, thereby enabling the proprietor to read, through the opening 95, the amount registered on the counting wheels. Until a key in the initial bank 16 is depressed, the hand lever 5, that is rigidly mounted on the shaft 4, is held locked against operation by the upper detent hook 67ª, which engages with the stud 96 projecting from the side of the said hand lever; but, when said lever is released, it is caused to oscillate upward by gravity, which may be assisted by a spring in any obvious manner. Secured to the shaft 4, and projecting downwardly and rearwardly therefrom, is an angular arm 98, said arm forming a support for the yokes 8, so that, when the hand lever 5 is drawn down to normal position, as is shown in Fig. 1, the arm 98 will gather up the yokes 8, that had swung downwardly when the hand lever 5 was released, and return them to their normal position. Pivoted on the side of said arm 98, and projecting to the angle thereof, is an auxiliary lever 99, whose upper edge projects slightly above the upper edge of the arm 98, and whose outer end is supported by a spring 100, that bears on a lug 101 on the said arm. The purpose of said auxiliary lever is to cushion any shock that the arm 98 might receive when the hand lever 5 is drawn downward. The outer part of the arm 98 is provided with a slot 103 in its lower end, said slot being adapted to receive a pin 104 in a sliding block 105. Said block 105 is mounted on horizontal guide rods 106, that are secured in upright lugs 107, that project from the plate 76. Said block 105 carries a pawl 108 that is adapted to trip over the serrations 109 on the stationary bar 110 while the hand lever 5 is being raised or drawn down, the length of the pawl being such that it can reverse itself only at the ends of the bar, which positions are reached when the hand lever 5 and the block 105 have reached the limit of their travel in either direction. This forms a full-stroke mechanism for the operating lever.

Bell.—Rigidly mounted on the main shaft 4, adjacent to one of the frames 3, is a cam 111; and adjacent thereto, but loosely mounted on said shaft, is a strut arm 112. This strut arm is normally held against a pin 113, shown in dotted lines in Fig. 10, which pin projects from the cam 111, or from a collar 114 that is secured to said shaft, said strut arm being impelled toward said pin by a coiled spring 115, that is secured at one end to the cam and bears with its opposite end against the edge of the strut arm. As the shaft is rocked with the main operating lever, the strut arm turns therewith, the arm bearing against said pin, unless it is arrested in its movements, when the shaft will continue to move independently thereof. Pivoted to the side frame 3, at a point 116, is a bell hammer 117, said hammer having lugs 118 projecting therefrom in the same direction and on opposite sides of the pivot point 116. A spring 119 encircles the hub of the bell hammer, said spring having one end secured to the frame 3 and its opposite end bearing against one of the lugs 118, so that said spring will exert a pressure against the hammer tending to force the same against a gong 120. Mounted within the lugs 118 of the bell hammer is a plunger 121, said plunger being spring pressed upwardly and having its upper end beveled, said upper end projecting into the path of movement of the outer end of the cam 111. Projecting from the bell hammer is a pin 122, said pin being so positioned that, when the parts are in normal position, as shown in Fig. 10, the lower end of the strut arm is substantially in contact therewith.

Assuming the parts to be in the normal position, as is shown in Figs. 10 and 11, when the main operating lever 5 is released, the shaft 4 will be rotated to the left. This will cause the cam 111 to push on the upper end of the plunger 121, which will rock the hammer 117 about its pivot point 116 and thus carry the lower or striking end of the hammer away from the gong. When the cam has passed the upper end of the plunger 121, the hammer would be thrown forward against the gong by the spring 119, but for the fact that the strut arm 112 is moved above the pin 122, which will intercept said arm and prevent its striking the gong until after the strut arm has passed the pin 122. When this takes place, the gong is struck, this operation taking place at substantially the beginning of the upward movement of the main operating lever. On the return of said lever, the strut arm 112 is forced backwardly by the pin 113; and, toward the end of its movement in this direction, it engages with the pin 122 on the bell hammer, and rocks the latter away from the gong for a second blow. The hammer is held in its retracted position until after the strut arm passes the pin 122, when it is again impelled forward by its spring to strike the gong, thus sounding an alarm at the moment when the main operating lever has substantially reached its normal position. By this construction, I have provided an alarm gong which is sounded just as the hand lever reaches its extreme upward and also its extreme downward positions.

*Printing mechanism.*—As any suitable form of printing mechanism may be employed with my improved cash register, I have illustrated such a mechanism in a conventional way only, in order to show how the same may be combined with the other parts of my cash register, and to make plain the advantages I secure by my improvements when used in a recording cash register.

As has been hereinbefore stated, the machine shown is provided with three rows of value keys and a row of clerks' initial keys, including the proprietor's key. The mechanism at the rear of these rows of keys is shown in Fig. 6, from which it will be seen that each row has its own stepped segment 7 and its own yoke 8. The three segments 7 at the right in this figure coöperate with the value keys, and the segment 7$^a$, at the left, coöperates with the clerks' initial and proprietor's keys. This latter segment is connected with the shorter or inner yoke 8$^c$, and this yoke is connected to a special printing segment 8$^b$, in a manner common in this type of cash register. The remaining printing segments are connected with the yokes 8 of the value keys. The indicator 10 that is shown in Fig. 1 is the special or clerks' indicator, such indicator being connected with the yoke 8$^c$ by the link 8$^a$ and segment 8$^b$. In Fig. 2 is shown the indicator for the "Cents" row of the value keys, such an indicator being provided for the remaining rows of value keys, although it is not deemed necessary to illustrate the same, as they are common in machines of this type, being shown, for example, in the old patent to McCormick No. 570,141.

It will thus be seen that the machine shown in the drawings and herein described is provided with a complete set of adding wheels for each clerk, with an indicating mechanism to display the amount of any transaction, with a recording mechanism to make a record of such transaction, with a special indicator for displaying the initial of the clerk or of the proprietor that has last operated the cash register, and with a special printing segment which prints upon the record the initial of the clerk or the proprietor that has last operated the machine. It will, of course, be understood that, instead of displaying and printing initials, any other characters or words may be displayed and printed for representing the person that has operated the machine.

With the interlocking mechanism between the value and the clerks' initial keys, it is impossible for a clerk to open either of the cash receptacles without first depressing a value key; and, when such key has been depressed, and this operation is followed by the depression of a clerk's key, the drawer belonging to that clerk will be exposed. The exposure of the drawer is not dependent upon the operation of the cash register, as the main operating lever may be held in its normal position while the drawer is opening or while it is standing open. Before the keys can be released, however, the main operating lever must be permitted to swing upwardly and then be pulled downwardly again, during which operation the transaction has been registered, indicated and recorded. The proprietor, on the other hand, can expose both of the cash drawers without the depression of any value key, as he would desire access to the drawers merely for the purpose of comparing the cash therein with the registers. A printed record and indication is also made of such transactions, from which record the proprietor can ascertain the number of times that the register has been operated by the depression of the proprietor's key. If one of the clerks, or any other person, should open the cash register by the depression of the proprietor's key, that fact will be disclosed to the proprietor upon inspection of the printed record.

In case both clerks are not on duty at the same time, the clerk going off duty may desire to lock his key against operation. To provide for this, I drill a hole 17$^a$ through the stems of the clerks' keys, through which a padlock 17$^b$ may be passed and locked. Such a hole may also be placed in the stem of the proprietor's key so that his key can not be operated except in his presence.

It will thus be seen that my improved cash register is safe-guarded against such fraudulent and dishonest manipulation as would be possible in a machine that does not provide a printed record of all transactions, and that does not require the depression of both a value and clerk's key before the machine can be operated.

Having thus described my invention, I claim

1. In a cash register, an operating mechanism including a series of oscillatory members, value setting elements for limiting the movements of said members in one direction, a single normally locked oscillatory hand lever for moving the members in the opposite direction, a series of normally unexposed cash safes, means for maintaining said safes in unexposed positions, selective manipulating devices for permitting any desired safe to be exposed and for releasing the hand lever, and interlocking mechanism between the value setting elements and the said selective manipulating devices for preventing the exposure of a cash safe until after the depression of a value setting element has been followed by the operation of the selective manipulating device corresponding with the safe to be exposed.

2. In a cash register, an operating mechanism including a series of oscillatory members, keys for limiting the movement of said members in one direction, a single normally locked oscillatory hand lever for moving the members in the opposite direction, a series of cash safes, means for maintaining said safes in an unexposed position, selective manipulating devices for permitting any desired safe to be exposed and for releasing the hand lever, interlocking mechanism between the keys and the said selective manipulating devices for preventing the exposure of a cash safe until after the depression of a key has been followed by the operation of the selective manipulating device corresponding with the safe to be exposed, and a recording device for keeping a continuous record showing the operations of the selective manipulating devices.

3. In a cash register, the combination with a series of oscillatory operating elements, of a plurality of independent counters controlled by the same, means for limiting the movements of the oscillatory elements in one direction, a series of independent cash drawers, a normally locked oscillatory hand lever for returning the said elements to their normal positions independently of the movements of any cash drawers, and selective manipulating means for releasing the desired counter and the hand lever and for opening a corresponding cash drawer.

4. In a cash register, the combination with a series of oscillatory operating elements, of a plurality of independent counters controlled by the same, means for limiting the movements of the oscillatory elements in one direction, a series of independent cash safes, a normally locked oscillatory hand lever for returning the elements to their normal positions independently of the movements of the cash safes, selective manipulating means for releasing the desired counter and the hand lever and for opening a corresponding cash safe, and mechanism for preventing the operation of the selective manipulating means until after the operation of the means for limiting the movements of the oscillatory elements.

5. In a cash register, the combination with an operating mechanism including accounting devices, and a series of oscillatory members, of means for limiting the movement of the members in one direction, a normally locked oscillatory hand lever controlling the movements of the elements in this same direction and for moving them positively in the opposite direction, a series of cash receptacles adapted to be opened simultaneously with the initial movement of the hand lever, a plurality of selective manipulating means each of which opens a desired receptacle and releases the hand lever, and mechanism for preventing the operation of the selective manipulating means until after the operation of the means for limiting the movements of the oscillatory elements.

6. In a cash register, the combination with operating mechanism including accounting devices, and a series of oscillatory operating members, means for limiting the movements of the members in one direction, a single normally locked oscillating hand lever for operating the oscillatory members, a series of cash safes any one of which is adapted to be opened simultaneously with the initial movement of the hand lever, and selective manipulating means for both opening any desired safe and releasing the oscillatory hand lever.

7. In a cash register, the combination with operating mechanism including account devices, and a series of oscillatory operating members, means for limiting the movements of the members in one direction, a normally locked oscillating hand lever for operating the oscillatory members, a series of cash safes adapted to be opened simultaneously with the initial movement of the hand lever, selective manipulating means for opening any desired safe and releasing the oscillatory hand lever, and mechanism for preventing the operation of the selective manipulating means until after the operation of the means for limiting the movements of the oscillatory elements.

8. In a cash register, the combination with an operating mechanism including accounting devices and a series of oscillatory members, means for limiting the movements of the members in one direction, a normally locked oscillating hand lever for moving the members in the opposite direction, a latch for holding the said lever normally in a retracted position, a series of cash safes adapted to be opened simultaneously with the movement of the said oscillating hand lever, and selective manipulating means for both releasing said oscillating hand lever and for opening a desired cash safe.

9. In a cash register, the combination with an operating mechanism including account devices and a series of oscillatory members, means for limiting the movements of the members in one direction, an oscillating device for moving the members in the opposite direction, a latch for holding the said device normally in a retracted position, a series of cash safes adapted to be opened simultaneously with the movement of the said oscillating device, selective manipulating means for releasing said oscillating device and for opening a desired cash safe, and mechanism for preventing the operation of the selective manipulating means until after the operation of the means for limiting the movements of the oscillatory elements.

10. In a cash register, the combination with an operating mechanism including accounting devices and a series of oscillatory operating elements, means for limiting the movement of the elements in one direction, an oscillating hand lever for returning the elements to their normal positions, a series of cash safes adapted to be opened simultaneously with the initial movement of the hand lever, selective manipulating means for controlling the opening of the cash safes and the release of the hand lever, and mechanism for preventing the operation of the selective manipulating means until after the operation of the means for limiting the movements of the oscillatory elements.

11. In a cash register, the combination with an operating mechanism including account devices, and a series of oscillatory members, of means for limiting the movements of the oscillatory members in one direction, a pivoted hand lever for moving the oscillatory members in the opposite direction, a series of cash drawers which may be opened independently of the movement of the lever, selective manipulating devices for releasing a desired drawer and for releasing the hand lever, and mechanism for preventing the operation of the selective manipulating means until after the operation of the means for limiting the movements of the oscillatory elements.

12. In a cash register, the combination with an operating mechanism including accounting devices, and a series of oscillatory members, of a series of keys for limiting the movements of the members in one direction, an oscillating hand lever for moving the members in the opposite direction, a latch for the hand lever, a series of cash drawers which may be moved simultaneously with the initial movement of the lever, latches for the cash drawers, selective manipulating devices for operating the desired drawer latch and the lever latch, and mechanism for preventing the operation of the selective manipulating devices until after a key has been operated.

13. In a cash register, the combination with an operating mechanism, of setting devices therefor, an oscillating actuator for the operating mechanism, a series of cash safes adapted to be opened simultaneously with the initial movement of the actuator, and means for releasing any desired safe and the actuator simultaneously, and mechanism requiring the operation of one of the setting devices prior to the operation of the means for releasing the safes.

14. In a cash register, the combination with an operating mechanism including a series of oscillatory members, keys for limiting the movements of the members in one direction, a hand lever for moving the members in the opposite direction, a plurality of independent counters coöperating with the operating elements, a plurality of cash drawers which may be opened independently of the movement of the hand lever, selective manipulating means for releasing the hand lever and determining which of the counters will be operated and which of the cash drawers will be opened, and mechanism for requiring the operation of a key before the selective manipulating means can be operated.

15. In a cash register the combination with an operating mechanism including a series of oscillatory members, keys for limiting the movement of the members in one direction, an oscillatory hand lever for moving the said members in the opposite direction, a series of independent accounting devices arranged to be brought into connection with the oscillatory members, a series of independent cash safes which may be opened independently of the movement of the hand lever, selective manipulating devices for determining which cash safe will be opened and which accounting device will be operated, means controlled by said selective devices for releasing the hand lever, and mechanism requiring the operation of a key before the selective manipulating devices can be operated.

16. In a cash register, the combination with a series of oscillatory elements, keys for limiting the movement of the elements in one direction, an oscillatory main actuator for moving said elements in the opposite direction, a printing mechanism, a series of cash safes adapted to be opened simultaneously with the initial movement of the main actuator, selective manipulating devices for opening a desired safe and for setting the printing mechanism, means controlled by the said selective devices for unlatching the main actuator and for producing a record showing which selective manipulating device and which cash safe has been operated, and mechanism for requiring the operation of a key before the selective manipulating devices can be operated.

17. In a cash register, the combination with a series of oscillatory members, of keys for limiting the movement of the members in one direction, an oscillatory hand lever for moving the members in the opposite direction, a series of independent counters arranged to coöperate with the oscillatory members, a special indicator, a series of cash safes arranged to be opened simultaneously with the movement of the hand lever, selective manipulating devices for opening a desired cash safe and for controlling the proper counters and the special indicator, means controlled by the selective devices for unlatching the hand lever, and mechanism for requiring the operation of a key before the selective manipulating devices can be operated.

18. In a cash register, the combination with an oscillating fulcrumed operating lever, a latch for said lever, a series of cash drawers, independent latches for said drawers, a series of selective devices, and connections for operating simultaneously the lever latch and any one of the drawer latches, a series of value keys and means under control of the value keys for preventing the operation of either latch until the value key is first depressed.

19. In a cash register, the combination with an oscillating fulcrumed operating lever, a latch for said lever, a series of cash drawers, independent latches for said drawers, a series of selective devices, and connections for operating simultaneously the lever latch and any one of the drawer latches, a series of value keys, means under control of the value keys for preventing the operation of either latch until the value key is first depressed, and a recording device for producing a record showing which keys and which selective device has been operated.

20. In a cash register, the combination with an operating mechanism, of an operating fulcrumed hand lever and latch for same, a series of cash drawers, independent latches for said drawers, a series of release devices connected to the drawer latches, means arranged to be operated by any of the release devices for releasing the operating hand lever, and means for producing a record showing which drawer release device has been operated.

21. In a cash register, the combination with a series of nested yokes having graduated stop segments, accounting devices coöperating with the yokes, a series of keys for limiting the movement of the yokes in one direction, a single oscillatory operating lever for said yokes, a series of cash drawers adapted to be opened simultaneously with the initial movement of the operating lever, selective manipulating devices for opening any desired drawer and releasing the operating lever, and mechanism for requiring the operation of one of said keys before the selective manipulating devices can be operated.

22. In a cash register, the combination with a series of oscillating elements, of keys for limiting the movement of the elements in one direction, an oscillatory hand lever for moving the elements in the opposite direction, accounting devices coöperating with the elements, a series of cash safes which may be opened simultaneously with the initial movement of the lever, a latch for the lever, selective devices for opening any desired safe and for operating the lever latch simultaneously therewith, and means requiring the operation of a key before the selective devices can be operated.

23. In a cash register, the combination with a series of oscillatory elements, means for limiting the movements of the elements in one direction, an oscillatory hand lever for moving said elements in the opposite direction, indicators connected with said elements, a series of cash safes arranged to be opened simultaneously with the initial movement of the hand lever, a common means for releasing the indicators, the hand lever and the selected cash safe, and mechanism for requiring the operation of the said limiting means before the said common releasing means can be operated.

24. In a cash register, the combination with a series of oscillatory elements, of keys for limiting the movements of the same in one direction, an oscillatory hand lever for moving said elements in the opposite direction, a series of indicators arranged to be set by said oscillatory elements, means for automatically returning the indicators to their normal positions when they are released, a series of cash safes any one of which may be opened simultaneously with the movement of the hand lever, means for selecting and opening a cash safe and for releasing the hand lever and the indicator, and mechanism for requiring the operation of a key before a cash safe can be selected and opened.

25. In a cash register, the combination with a series of nested yokes carrying graduated stop segments, of keys coöperating with said segments, of accounting devices controlled by the yokes, an oscillatory hand lever for operating said yokes, a series of independent cash drawers, selective manipulating devices for releasing the desired drawer and for simultaneously releasing the hand lever, and means for requiring the operation of a key before the selective manipulating devices can be operated.

26. In a cash register, the combination with a series of oscillating operating elements, of accounting devices controlled by said elements, means for limiting the movements of the elements in one direction, an oscillatory hand lever for moving the elements in the opposite direction, a series of independent cash safes, selective manipulating devices for releasing the desired safe and the hand lever, and mechanism for requiring the operation of said limiting means before the selective manipulating devices can be operated.

27. In a cash register, the combination with operating mechanism, of accounting devices, a pivoted operating hand lever for actuating the same, a series of independent cash drawers, means for latching the drawers in their closed positions, and devices for preventing the relatching of a cash drawer after it has been opened until the pivoted hand lever has been returned to normal position.

28. In a cash register, the combination with operating mechanism, of accounting devices, a pivoted operating hand lever for actuating the same, a series of cash drawers, means for latching the drawers in their closed positions, devices for preventing the relatching of a cash drawer after it has been opened until the pivoted hand lever has been returned to normal position, and a recording mechanism for producing a record showing which drawer has been unlatched.

29. In a cash register, the combination with a series of oscillatory elements, of accounting devices coöperating therewith, means for limiting the movements of the elements in one direction, a single oscillating hand lever for returning the elements to their normal positions, a series of independent cash drawers, latches for said drawers, and means for preventing the relatching of a released drawer until the oscillatory elements are returned to normal position by the oscillating hand lever.

30. In a cash register, the combination of a series of oscillatory elements, of accounting devices coöperating therewith, means for limiting the movements of the elements in one direction, a single oscillating hand lever for returning the elements to their normal positions, a series of independent cash drawers, latches for said drawers, means for preventing the relatching of a released drawer until the oscillatory elements are returned to normal position by the oscillatory hand lever, and a recording mechanism for producing a record showing which drawer has been unlatched.

31. In a cash register, the combination with a suitable casing, of a series of oscillatory elements, accounting devices coöperating therewith, value keys for limiting the movements of the elements in one direction, a single pivoted hand lever for moving said elements in the opposite direction, a series of cash drawers, latches for said drawers, clerks', keys for unlatching any cash drawer desired, springs for projecting the drawers from the casing, means for preventing the relatching of the drawers in the casing until after the pivoted hand lever has returned the oscillatory elements to their normal positions and means requiring the operation of a value-key before any cash drawer can be released by a clerk's key.

32. In a cash register, the combination with a suitable casing, of a series of oscillatory elements, accounting devices coöperating therewith, value keys for limiting the movements of the elements in one direction, a single pivoted hand lever for moving said elements in the opposite direction, a series of cash drawers, latches for said drawers, clerks' keys for releasing any drawer desired, springs for normally projecting the drawers from the casing, means for preventing the relatching of the drawers in the casing until after the pivoted hand lever has returned the oscillatory elements to their normal positions, a recording mechanism for producing a record showing which receptacle has been unlatched and means requiring an operation of a value-key before any drawer can be released by a clerk's key.

33. In a cash register, the combination with a series of oscillating yokes pivoted co-axially upon a single shaft, keys for limiting the movement of said yokes in one direction, a single oscillatory hand-lever for moving the yokes in the opposite direction, a latch for said hand-lever, a plurality of independent cash drawers, a release key for each drawer, and connections between each release key and its respective drawer and between each release key and the latch for the hand-lever whereby the operation of a release key will open its respective drawer and will also release the hand lever.

34. In a cash register, the combination with an operating mechanism including oscillatory elements, an oscillatory hand-lever for moving said elements a printing device controlled by said elements, value keys for controlling the movement of the elements in one direction, clerks' release keys for said elements and operating mechanism, a series of cash drawers, means for releasing any drawer by the depression of its corresponding clerks' release key, means controlled by the said release keys for setting the printing device so as to produce a record showing which release key and which drawer has been operated, and mechanism for compelling the operation of a value key before a clerk's key can be operated.

35. In a cash register, the combination with a plurality of accounting devices, common operating mechanism for said devices, a normally locked oscillatory operating handle for said mechanism, a series of cash drawers, release keys for said operating handle, and for cash drawers, an indicator and type carrier controlled by the release keys and means whereby the operation of a release key will set the type carrier and indicator.

36. In a cash register, the combination with a plurality of normally inoperative accounting devices, common operating mechanism for said devices, a normally locked oscillatory operating handle for said mechanism, release keys for said operating handle, a series of cash drawers, an indicator and type carrier controlled by the release keys and means whereby the operation of a release key will set the type carrier and indicator, and will release the corresponding accounting device the operating handle and the corresponding cash drawer.

37. In a cash register, the combination with an operating mechanism, value setting elements for controlling the operating mechanism in one direction, a normally locked, oscillatory hand-lever for moving the said mechanism in the opposite direction, a series of cash receptacles, a series of manipulative controlling devices for said receptacles and for releasing the hand lever and interlocking means between the value setting elements and the manipulative controlling devices for preventing access to a cash receptacle until the depression of a value setting element is followed by the operation of one of said controlling devices.

38. In a cash register, the combination with an operating mechanism, value setting elements for controlling the operating mechanism in one direction, a normally locked, oscillatory hand-lever for moving the said mechanism in the opposite direction, a series of cash receptacles, a series of manipulative controlling devices for said receptacles and for releasing the hand-lever, interlocking means between the valve setting elements and the manipulative controlling devices for preventing access to a cash receptacle until the depression of a value setting element is followed by the operation of one of said controlling devices, and mechanism for producing a record showing which cash safe has been released.

39. In a cash register, the combination of an operating mechanism, value keys for controlling the same, a series of cash drawers, clerks' keys for controlling the cash drawers, interlocking means between the value keys and clerks' keys, and means for preventing the opening of a cash drawer until a clerk's key has been fully depressed.

40. In a cash register, the combination of an operating mechanism, value keys for controlling the same, a series of cash drawers, clerks' keys for controlling the cash drawers, interlocking means between the value keys and clerks' keys, said means requiring a full operation of a clerk's key for opening a cash drawer and mechanism for producing a record showing which cash safe has been released.

41. In a cash register, the combination with a series of oscillating elements, value keys for controlling the same, an oscillatory hand-lever for operating said elements, a series of cash drawers, clerks' keys for releasing said drawers and said hand lever and means for preventing the operation of more than one clerks' key at a time, so that all the cash drawers are prevented from opening except the one corresponding to the single clerk's key operated.

42. In a cash register, the combination with a series of oscillating elements, value keys for controlling the same, an oscillatory hand-lever for operating said elements, a series of cash drawers, clerks' keys for releasing said drawers and said hand lever, means for preventing the operation of more than one clerk's key at a time, so that all the cash drawers are prevented from opening except the one corresponding to the single clerk's key operated, and mechanism for producing a record showing which cash safe has been released.

43. In a cash register, the combination with a series of oscillating elements, an oscillatory hand-lever for operating said elements, a series of value keys for controlling the movements of said mechanism in one direction, a series of clerks' keys for releasing the hand lever, a series of cash drawers, a series of independent pivoted locking elements intermediate the respective clerks' keys and drawers, and interlocking mechanism requiring the operation of a value key before a clerk's key can be depressed.

44. In a cash register of the class described, a series of normally depressible value keys, detents for the same, said detents being adapted to release any key upon the depression of another key in the same series, a plurality of normally inoperative clerks' initial drawer release keys, a detent for said drawer release keys, and a latch plate for said drawer release keys, said latch plate being adapted to move the value key detent into unreleasable position and thereby render the depressed value keys non-releasable until a registration is complete.

45. In a cash register of the class described, a plurality of drawers, a series of normally depressible value keys, detents for the same, said detents being adapted to release any key upon the depression of another key in the same series, a plurality of normally inoperative clerks' initial drawer release keys, there being one of said keys for each drawer, a detent for said drawer release keys and a latch plate for said drawer release keys, said latch plate being adapted to move the value key detent into unreleasable position and thereby render the depressed value keys non-releasable until a registration is complete.

46. In a cash register, the combination of an operating mechanism including oscillatory members, an oscillating handle therefor, value keys for controlling the movement of the members, a latch for said handle, a series of release keys controlling said latch, locking devices intermediate said release keys and latch for preventing the release of said handle and the operating mechanism until the release key is positively locked in its operated position and means for preventing the operation of a release key until after a value key has been operated.

47. In a cash register, the combination of an operating mechanism including oscillatory members, an oscillating handle therefor, value keys for controlling the movement of the members, a latch for said handle, a series of release keys controlling said latch, locking devices intermediate said release keys and latch for preventing the release of said handle and the operating mechanism until the release key is positively locked in its operated position, means for preventing the operation of a release key until after a value key has been operated, an indicator for showing what release key has been operated, and means controlled by the release key for permitting said indicator to come to zero position.

48. In a cash register, the combination with an operating mechanism, a detent latch for holding said mechanism in normal position, a release key for said latch, a second latch connected with the detent latch for the operating mechanism, and means connecting the release key with the second latch whereby the release of the operating mechanism is prevented until the release key is fully depressed.

49. In a cash register, the combination with an operating mechanism, a detent latch for holding said mechanism in normal position, a release key, a latch plate operated by said key, said latch plate operating the detent latch, and means of coupling the latch plate to the detent latch, whereby the release of the operating mechanism is prevented until the release key is fully depressed.

50. In a cash register, the combination with an operating mechanism, a plurality of release keys for the same, a double detent for locking the operating mechanism and means under control of the double detent for compelling the full depression of a release key before the main operating mechanism can be operated.

51. In a cash register, the combination with an operating mechanism, of an accounting device, a printing device, a plurality of cash drawers, a plurality of clerks' release keys for the same, there being a clerks' release key for each drawer, a double detent for the main operating mechanism, means under control of the double detent for compelling the full depression of a release key before the main operating mechanism can be operated, the printing device being adapted to produce a record showing which release key has been operated.

52. In a cash register, the combination with an operating mechanism, of an accounting device, a plurality of cash receptacles, a plurality of latches for the said receptacles, a double detent for the operating mechanism, a release key for each cash receptacle, means connecting said release keys and the latches for their respective receptacles and means engaging the double detent for preventing the operation of the operating mechanism until a release key is arrested in depressed position.

53. In a cash register, the combination with an operating mechanism, of a printing device, a plurality of cash receptacles, a plurality of latches for the said receptacles, a double detent for the operating mechanism, a release key for each cash receptacle, means connecting said release keys and the latches for their respective receptacles and means engaging the double detent for preventing the operation of the operating mechanism until a release key is arrested in depressed position, said printing device being adapted to produce a record showing which release key has been operated.

54. In a cash register, the combination with an operating mechanism, of an accounting device operated thereby, a plurality of independent cash drawers, a plurality of clerks' initial release keys, there being one key corresponding to and releasing each drawer, a proprietor's key adapted to release all drawers, a double detent for the operating mechanism, a detent plate common to each release key for holding said keys in depressed position, a release plate for each clerks' key, said release plates being common to the proprietor's key and a latch plate common to the clerks' keys and proprietor's key, said latch plate being provided with a stud, said stud being adapted to be engaged by a hook of the double detent when any of said keys are depressed, whereby the operating mechanism can not be released by a blow upon any release key and said keys must be fully depressed before the machine can be operated.

55. In a cash register, the combination with an operating mechanism, of an accounting device operated thereby, a plurality of independent cash drawers, a plurality of clerks' initial release keys, there being one key corresponding to and releasing each drawer, a proprietor's key adapted to release all drawers, a latch for the operating mechanism, a detent plate common to each release key for holding said keys in depressed position, a release plate for each clerks' key, said release plates being common to the proprietor's key, a latch plate common to the clerks' keys and proprietor's key, said latch plate being provided with a stud, and means for coupling said stud to the latch for the operating mechanism, whereby the operating mechanism can not be released by a blow upon any release key and said keys must be fully depressed before the machine can be operated.

56. In a cash register adapted for use by a plurality of clerks, a plurality of cash drawers,—one for each clerk, a series of clerks' initial draw-release keys, each key being adapted to release its corresponding cash drawer, a proprietor's key adapted to open all of the cash drawers simultaneously, and means for preventing the operation of a clerks' key while the proprietor's key is in operated position.

57. In a cash register adapted for use by a plurality of clerks, a plurality of cash drawers,—one for each clerk, a series of clerks' initial drawer-release keys, each key being adapted to release its corresponding cash drawer, a proprietor's key adapted to open all of the cash drawers simultaneously, and means for preventing the operation of the proprietor's key while a clerk's key is in operated position.

58. In a cash register adapted for the use of different clerks, a plurality of cash drawers,—one for each clerk, a series of value setting elements, a series of drawer releasing elements, there being a releasing element for each clerk and each drawer and a releasing element for the proprietor, interlocking mechanism between the value setting elements and the releasing elements for preventing the operation of a clerks' releasing element until after the operation of a value setting element, said interlocking mechanism also preventing the operation of the proprietor's releasing element after the operation of a value setting element and means for opening simultaneously all of the cash drawers by a depression of the proprietor's releasing element.

59. In a cash register adapted for the use of different clerks, a plurality of cash drawers,—one for each clerk, a series of value setting elements, a series of drawer releasing elements, there being a releasing element for each clerk and each drawer and a releasing element for the proprietor, interlocking mechanism between the value setting elements and the releasing elements for preventing the operation of a clerks' releasing element until after the operation of a value setting element, said interlocking mechanism also preventing the operation of the proprietor's releasing element after the operation of a value setting element, means for opening simultaneously all of the cash drawers by a depression of the proprietor's releasing element, and mechanism for producing a record showing what releasing element has been operated.

60. In a cash register adapted for the use of a plurality of clerks, a plurality of cash drawers, one for each clerk, a plurality of clerks' initial drawer release keys, there being one of said keys for each drawer and each key adapted to release its corresponding drawer only, a proprietor's key adapted to open all the cash drawers simultaneously, means for preventing the depression of more than one drawer release key at one operation of the cash register.

61. In a cash register adapted for the use of a plurality of clerks, a plurality of cash drawers, one for each clerk, a plurality of clerks' initial drawer release keys, there being one of said keys for each drawer and each key adapted to release its corresponding drawer only, a proprietor's key adapted to open all the cash drawers simultaneously, means for preventing the depression of more than one drawer release key at one operation of the cash register, and a recording device for producing a record showing which release key has been operated.

62. In a cash register adapted to be used by different clerks, the combination of register operating elements, value keys for controlling the said elements, a plurality of cash drawers, one for each clerk, a plurality of clerks' initial drawer release keys, one for each clerk, said release keys having means for attaching a pad-lock thereto, a proprietor's release key, latches for said cash drawers and means connecting said release keys with the drawer latches, the pad-locks on the clerks' keys being adapted to prevent a depression of said keys and access to the corresponding cash drawer except by the proprietor's release key.

63. In a cash register adapted to be used by different clerks, the combination of register operating members, value setting elements for controlling the said members, a plurality of cash safes, one for each clerk, a plurality of clerks' safe releasing elements, one for each clerk, said releasing elements having means for attaching a pad-lock thereto, a proprietor's releasing element, latches for said cash safes and means connecting said releasing elements with the safe latches, the pad-locks on the clerks' releasing elements being adapted to prevent an operation of said releasing elements and access to the corresponding cash safe except by the proprietor's releasing element.

64. In a cash register adapted for the use of different clerks, register operating elements, cash keys for determining the movement of said elements, a plurality of cash drawers, one for each clerk, a proprietor's release key for the cash drawers, a plurality of clerks' initial drawer release keys, one for each clerk, said clerks' keys having slots to receive the user's private pad-lock, said pad-lock being adapted to prevent the depression of said key and access to the corresponding cash drawer by another clerk, and means under control of the proprietor's key for opening all of the cash drawers when the clerks' keys are either locked or unlocked.

65. In a cash register, the combination of an operating mechanism, of a plurality of cash drawers independent of the operating mechanism, a series of clerks' initial release keys, one for each drawer, a proprietor's release key controlling all the drawers, means to prevent the depression of more than one release key at a time and a release plate between each of the release keys and the corresponding drawer whereby, upon the depression of a clerk's initial key, the drawer corresponding therewith will be released and upon a depression of the proprietor's release key all the drawers will be simultaneously released.

66. In a cash register, the combination of an operating mechanism including a normally locked hand member, of a plurality of cash drawers independent of the hand member, a series of clerks' initial release keys, one for each drawer, a proprietor's release key controlling all the drawers, means to prevent the depression of more than one release key at a time, a release plate between each of the release keys and the corresponding drawers, whereby, upon the depression of a clerk's initial key, the drawer corresponding therewith will be released and upon a depression of the proprietor's release key all the drawers will be simultaneously released, and means for unlocking the hand member by the depression of either of the release keys.

67. In a cash register, a main actuator therefor, a pawl connected with said actuator, a rack adapted to be engaged by said pawl, said rack and pawl requiring a full stroke of the actuator in each direction, an alarm bell and means for ringing said bell twice at each operation of the machine, the bell being rung first upon the release of the main actuator and second after the main actuator has been returned and arrested in normal position, whereby the operator may know that the register is ready for the next transaction.

68. In a cash register, an accounting mechanism, an oscillatory member for operating said mechanism, an alarm bell, a hammer for said bell, and means carried by said member and engaging with the hammer twice during the operation of the cash register, the bell ringing only upon the initial and upon the final movement of the oscillatory member.

69. In a cash register, a main shaft, means for oscillating said shaft as the register is operated, a cam carried by said shaft, an alarm bell, a hammer for said bell, a spring-pressed plunger carried by said hammer for engagement with the said cam, said plunger engaging the cam twice during the operation of the cash register to ring the bell upon the initial movement of the said shaft and also at the end of the return movement thereof an accounting device, and connections for operating said device from the main shaft.

70. In a cash register, a main shaft, means for oscillating said shaft during the operation of the register, a cam carried by said shaft, an alarm bell, a hammer for said bell, means carried by said hammer and adapted to be engaged by said cam as the latter oscillates with the shaft, a strut arm carried by said shaft, a pin on the bell hammer, said pin adapted to be engaged by the strut arm to prevent the ringing of the bell until the main shaft has oscillated to the desired extent, an accounting device, and connections for operating said device from the main shaft.

71. In a cash register, a main shaft, means for oscillating said shaft during the operation of the register, a cam carried by said shaft, an alarm bell, a hammer for said bell, a plunger carried by said hammer and adapted to be engaged by said cam as the latter oscillates with the shaft, a strut arm carried by said shaft, a pin on the bell hammer, said pin adapted to be engaged by the strut arm to prevent the ringing of the bell until the main shaft has oscillated to the desired extent, said cam engaging the plunger to cause the bell to ring at substantially the beginning of the advance oscillation of the main shaft and also at substantially the end of the return oscillation thereof an accounting device, and connections for operating said device from the main shaft.

72. In a cash register, a registering device, means for operating said registering device, value keys for controlling said operating means, a shield for the registering devices, said shield being provided with a slot through which the register may be read, a shutter for closing said slot, a plurality of clerks' initial keys, a proprietor's key, having means for applying a pad lock thereto means for preventing the operation of a clerks' key when the proprietor's key is operated and means connected with the proprietor's key for opening the shutter so as to disclose the register wheels through the said slot.

73. In a cash register, a registering device, means for operating said registering device, value keys for controlling said operating means, a shield for the registering devices, said shield being provided with a slot through which the register may be read, a shutter for closing said slot, a plurality of clerk's initial keys, a proprietor's key, having means for applying a pad lock thereto means connected with the proprietor's key for opening the shutter so as to disclose the register wheels through the said slot, and means for preventing the shutter from operating while a value key or a clerk's key is operated.

74. In a cash register, a registering device and means for operating the same, a shield for covering the said registering device, said shield being provided with a slot through which the registering device may be read, a shutter adapted to normally close the said slot, a lever pivoted to the shield and having a slot for engaging with the said shutter and a key connected with said lever whereby the depression of said key will oscillate the said lever and rock the shutter so as to disclose the registering device through the slot in the shield.

75. In a cash register, a registering device and means for operating the same, value keys for controlling said means, a shield for covering the said registering device, said shield being provided with a slot through which the registering device may be read, a shutter adapted to normally close the said slot, a lever pivoted to the shield and having a slot for engaging with the said shutter, a key connected with said lever whereby the depression of said key will oscillate the said lever and rock the shutter so as to disclose the registering device through the slot in the shield, and means for preventing the operation of the shutter while a value key is operated.

76. In a cash register adapted for the use of a plurality of clerks, a plurality of registering devices, there being one registering device for each clerk, means for operating the registering devices upon the operation of the cash register, means for normally holding said registering devices out of operation, a series of clerks' keys, one for each register, connections between each clerks' key and the corresponding registering device, whereby the depression of a clerk's key will release the register corresponding thereto, a proprietor's key, a shield for the registering devices, said shield having a slot, a shutter for closing said slot, means connected with the proprietor's key for rocking said shutter to disclose the registers through the slot in the shield and interlocking mechanism between the clerks' keys and the proprietor's keys for preventing the opening of the shutter after a clerk's key has been depressed.

77. In a cash register adapted for the use of a plurality of clerks, a plurality of registering devices, and a plurality of cash drawers, there being one cash drawer and one registering device for each clerk, means for operating the registering devices upon the operation of the cash register, means for normally holding said registering devices out of operation, a series of clerks' keys, one for each register and cash drawer, latches for said cash drawer, connections between each clerks' key and the latch for the corresponding cash drawer and between each clerks' key and the corresponding registering device, whereby the depression of a clerk's key will release both the drawer and the register corresponding thereto, a proprietor's key, a shield for the registering devices, said shield having a slot, a shutter for closing said slot, means connected with the proprietor's key for rocking said shutter to disclose the registers through the slots in the shield and interlocking mechanism between the clerks' keys and the proprietor's keys for preventing the opening of the shutter after a clerk's key has been depressed.

78. In a cash register and recorder adapted to the use of a plurality of clerks or departments, a plurality of separate cash receptacles, one for each clerk or department, a series of operating yokes, a series of springs for moving said yokes to initial position, an oscillating, normally locked main operating hand-lever for returning the yokes to normal position, a series of value keys, a series of clerk's initial keys, and interlocking mechanism requiring the depression of a value key before a clerk's initial key can be operated to release its corresponding drawer and the oscillating hand-lever.

79. In a cash register, a registering mechanism, means for operating said mechanism, a plurality of character keys, a plurality of cash drawers, connections between each of said keys and its respective drawer, whereby the drawer may be released when its key is depressed, means for preventing the operation of the operating mechanism until after a character key is fully depressed, and means for preventing the opening or release of another drawer until the register is placed in normal position and the registering mechanism has been operated.

80. In a cash register, a bank of keys, means for locking said keys in their operated positions, a plurality of cash drawers, one for each key, connections between each key and its respective cash drawer for releasing the latter when its key is depressed, a normally locked oscillatory operating member, a plate movable by the depression of any one of said keys, connections between said plate and the operating member, whereby the latter is unlocked when a key is depressed, the release of the operating member and the cash drawer taking place substantially at the same instant, and after the key has been moved to locked position.

81. In a cash register, a bank of keys, means for locking said keys in their operated positions, a plurality of cash drawers, one for each key, connections between each key and its respective cash drawer for releasing the latter when its key is depressed, a normally locked oscillatory operating member, a plate movable by the depression of any one of said keys, connections between said plate and the operating member whereby the latter is unlocked when the key is depressed, the release of the operating member and the cash drawer taking place substantially simultaneously and after the key has been moved to locked position, and means for preventing the subsequent operation of a second key.

82. In a cash register, a bank of keys, means for locking said keys in their operated positions, a plurality of cash drawers, one for each key, connections between each key and its respective cash drawer for releasing the latter when its key is depressed, a normally locked oscillatory operating member, a plate movable by the depression of any one of said keys, connections between said plate and the operating member, whereby the latter is unlocked when the key is depressed, the release of the operating member and the cash drawer taking place substantially simultaneously and after the key has been moved to locked position, and a recording device that is adapted to produce a record showing what key has been operated.

In testimony whereof, I hereunto affix my signature in the presence of two witnesses.

HENRY S. HALLWOOD.

Witnesses:
EMILIE SMITH,
G. M. GRIDLEY.